Aug. 3, 1965    M. W. DOLPHIN    3,198,181
INTERNAL COMBUSTION ENGINE
Original Filed Nov. 19, 1963    2 Sheets-Sheet 1
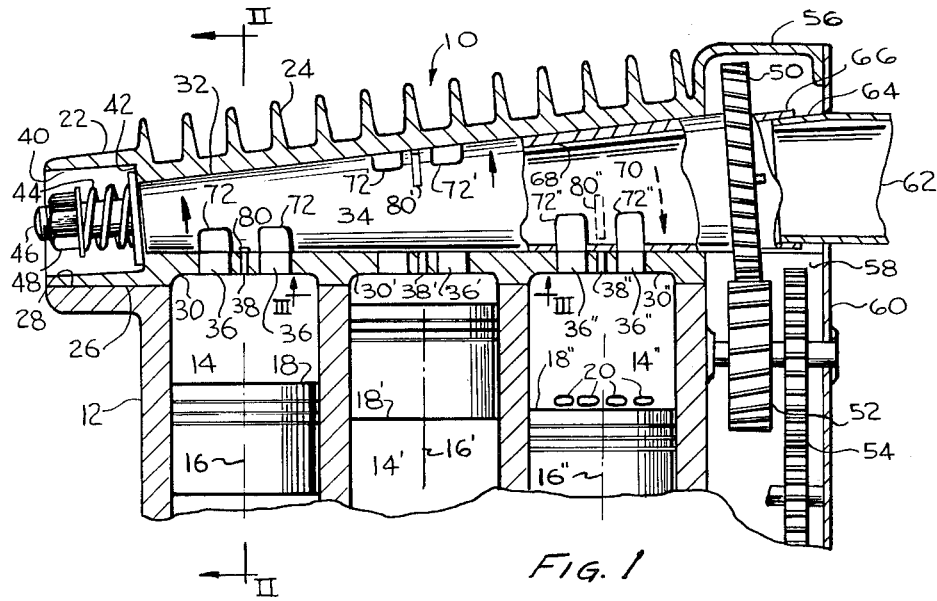
FIG. 1
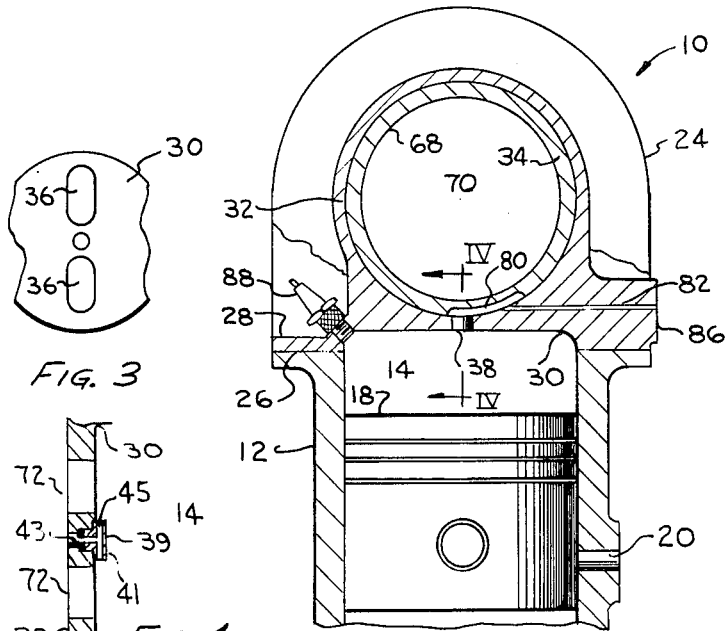
FIG. 3
FIG. 4
FIG. 2
INVENTOR.
MAYNARD W. DOLPHIN
BY [signature]
HIS AGENT Aug. 3, 1965  M. W. DOLPHIN  3,198,181
INTERNAL COMBUSTION ENGINE
Original Filed Nov. 19, 1963  2 Sheets-Sheet 2

VALVE EVENTS VS. CRANK ANGLE

INVENTOR.
MAYNARD W. DOLPHIN
BY R. K. Washburn
HIS AGENT

United States Patent Office 3,198,181
Patented Aug. 3, 1965

3,198,181
INTERNAL COMBUSTION ENGINE
Maynard W. Dolphin, 844 Hackett St., Beloit, Wis.
Continuation of application Ser. No. 324,785, Nov. 19, 1963. This application Dec. 10, 1964, Ser. No. 419,278
10 Claims. (Cl. 123—59)

This application is a continuation of my prior application, Serial No. 324,785, filed November 19, 1963, which is now abandoned.

The instant invention relates to reciprocating internal combustion engines and particularly to an engine having a rotatable tubular valve and cylinder head arrangement with means to control the admission of fresh air and of gaseous fuel separately and independently into the combution chambers of the engine. The invention further contemplates a method of delivering gaseous fuel and fresh air for combustion separately into the cylinders.

The invention is especially adapted for application to two-stroke-cycle engines, though not so restricted.

Internal combustion engines are classified in terms of their principal features in many ways for purposes of study and analysis. For example, "aspiration" engines are those which employ the suction effect of all or part of the inward piston stroke to draw into the combustion chamber the necessary mixture of air and fuel. "Injection" engines, on the other hand, are those which employ divers means to force liquid fuel into the combustion chamber, usually at the instant at which ignition is to take place.

The engine of the present invention relates to the injection engine rather than to the aspiration engine and is intended to expand upon the inherent advantages of injection engines by providing method and means for the injection of airless dense gaseous fuel rather than liquid.

Many workers in the prior art have proposed the introduction into the combustion chamber of an internal combustion engine various kinds of gaseous fuel mixtures, often achieved by applying heat to combustible mixtures of air and fuel. So far as I am aware these attempts have generally resulted only in a reduction of the quantity of potential fuel energy delivered into the cylinder, because of the concomitant reduction in volumetric efficiency, and the desired advantages have not been attained.

Since the present engine is not an aspiration engine in the ordinary sense of the word and is intended to breathe uncarbureted air and dense gaseous fuel it can be said to be unrelated to the class of engines employing carburetors and like devices for the premixture of air and fuel.

The injection class of engines require fuel pumps and controls of high precision and complexity in order to deliver relatively small, perfectly equal, charges of liquid fuel through the distribution system and through very fine nozzles to attain the desired degree of mixing within the cylinders of the engine. Up to the present time this type of fuel delivery has been most successfully employed in engines of the diesel type. The extreme precision as well as the high pressures employed makes such fuel systems quite sensitive to the presence of foreign material in the fuel.

A considerable number of workers in the prior art also have developed engines employing rotary valves for the introduction of air-fuel mixtures and for the disposal of products of the combustion to exhaust. In all instances of which I am aware these designs have exposed the rotary valves to the high temperatures, corrosion products, and lubrication problems attendant upon the handling therethrough of the exhausted gases.

It is therefore an object of my invention to overcome the mentioned disadvantages found in the engines of the prior art.

A further object of my invention is to provide a method of operation of an internal combustion engine wherein dense, airless, gaseous fuel and combustion air are separately introduced into the combustion space, and mixed and burned therein.

Another objects of my invention is to provide a tubular rotatable valve member having one or more sets of ports for air and a corresponding number of sets of admission canals for fuel and thereby a relatively slower rotational movement of the valve member.

Another object hereof is to avoid the limitations on cylinder combustion space size and shape which are imposed by the size and lift of conventional poppet type valves.

A further object of my invention is to provide a two stroke cycle engine which more closely approaches the theoretical advantage of twice the power output obtained from the comparable four stroke cycle engine.

The foregoing, and other objects, features and advantages will become apparent or be explicitly set forth in the following description together with the accompanying drawings, in which:

FIGURE 1 is a longitudinal sectional elevation of a preferred embodiment of the engine of the instant invention.

FIGURE 2 is a transverse sectional elevation taken on line II—II of FIGURE 1.

FIGURE 3 is a partial plan view of air and fuel inlet means for one typical cylinder, taken as indicated by line III—III of FIGURE 1.

FIGURE 4 is a partial sectional view of an alternative form of fuel inlet means, taken on line IV—IV of FIGURE 2.

Figure 5:
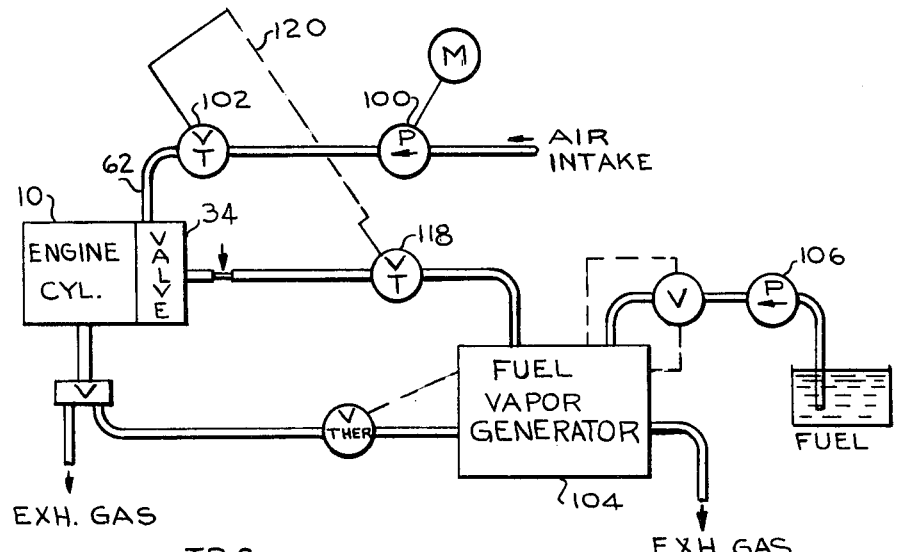
FIGURE 5 is a flow diagram of fuel and air supply of the instant invention.

The method and apparatus of this invention are applicable to reciprocating combustion engines in general. For purposes of the description the drawings in general and particularly FIGURES 1 and 2 show in simplified schematic form a reciprocating engine having three cylinders in line. As the description proceeds it will be obvious that the number of cylinders, or banks of cylinders is immaterial and that other known variants of engine design also may employ the instant invention.

The engine 10 shown comprise a cylinder block 12, three cylinders 14, 14', 14", having vertical axes 16, pistons 18, 18', 18" reciprocable within the respective cylinders along the said axes 16 and connected by the usual connecting rods, piston pins, to the respective throws of a crankshaft (not shown). Through the cylinder wall, a series of exhaust ports 20 are provided to permit the spent gases, the products of combustion, to escape into an exhaust collector pipe (not shown). These ports 20 are located to be uncovered by piston 18 at the lower end of its stroke. As will be further explained hereinafter the products of combustion and the scavenging air flow are moved outwardly through ports for disposal at the end of the combustion stroke.

Cylinder head 22 in FIGURE 1 includes a multiplicity of fins 24. These fins provide for the dissipation of heat to the ambient atmosphere and are intended to be representative only, since the engine may be either air or liquid cooled.

The top surface 26 of the cylinder block 12 is finished in a plane surface to engage a corresponding plane finished surface 28 of the cylinder head 22. A gasket (not shown) is also used. In the cylinder head 22 pockets 30, 30', 30" (depending upon the desired clearance volume) form the cylinder head boundary of the combustion space for each cylinder. Both size and shape of the clearance volume of an internal combustion engine have an important effect upon the compression ratio and upon the tendency of certain fuels to pre-ignite, called detonation or ping. An advantage of this invention is the increased freedom to size and to shape the combustion chamber as contrasted to the restrictions in designing the combustion chamber to make adequate provisions for size and lift of conventional poppet valves.

Lengthwise, through the cylinder head 22, a bore 32 of circular cross-section receives a rotatable valve member 34 which will be more fully described hereinafter. Preferably, the bore 32 is tapered and forms the frustum of a right circular cone having a small angle of convergence. It may, however, be a straight cylindrical bore, although with the sacrifice of some of the potential advantages of the invention.

Extending through the wall of the cylinder head 22 are gate openings 36, 36', 36" providing for flow communication from the valve bore 32 to the pocket 30 of the combustion chamber. As will be apparent, the rate of air flow to the cylinder will determine the area of each gate opening or of any combination of gate means chosen. Preferably these openings should be sized for air velocities of from ten to twenty-five thousand feet per minute. The length, i.e., the distance traversed by the entering air from the wall of the bore 32 to the combustion space pocket 30 is a permanent part of the clearance volume and must be considered in determining the compression ratio of the engine. Fuel nozzles 38, 38', 38" for the admission of airless dense gaseous fuel are located between the air gates 36. The nozzle 38 may take a number of forms, as will be discussed subsequently herein, to conduct a flow of gas communicating between the valve bore 32 and cylinder combustion space 30. The flow area of this passage is preferably based upon the same general velocity of flow as has been mentioned for air flow. This results, of course, in an area from one eighth to one twentieth of the air flow gate area and will be selected in accordance with the desired air-fuel volumetric ratio.

The cylinder head is provided with a counterbore 40 coaxial with main valve bore 32 through the head 22 and terminating at the smaller end of the bore in a seat 42 which supports the thrust reaction of a spring 44. Those skilled in the art will recognize that the practical construction may take diverse forms and may make use of commercial anti-friction thrust bearings if desired.

The tubular valve sleeve member 34 is closed at its small end and has affixed thereto a coaxial stud or tank 46. The spring thrust is applied to a stop means or nut 48. The action of the spring 44 therefore is to urge the tapered tubular valve sleeve member 34 toward the smaller end of bore 32 into close running relationship with the valve bore 32 in the cylinder head 22.

The opposite, larger end of the valve sleeve member 34 has fitted thereon one of a pair of helical timing gears 50, 52 by which means the tubular valve is driven in timed relation with the rotation of the crankshaft (not shown) and which in turn establishes the desired timed relation with the piston reciprocation.

As is well known, heilcal gears produce an axial thrust component proportional to the load transmitted by one to another. In this invention, this property is employed to produce a slight axial thrust outward against action of the spring. By this means a change in the frictional resistance torque of the tubular valve member automatically produces an increased corresponding axial thrust which tends to reduce the frictional torque, thereby maintaining the tubular valve sleeve in a freely rotatable condition.

The pair of helical gears 50, 52 described may be driven from the crankshaft by a sequence of gears 54, as shown, in FIGURE 1, or by a timing chain, from a chain sprocket mounted on the crankshaft (not shown).

Specific means for the lubrication of the rotatable valve member, not forming a part of this invention, are not shown. It will, of course, be desirable to provide for such lubrication by measures well known in the art such as oil grooving, or the like to minimize friction and wear during rotation. It is a specific feature of this invention that the rotatable tubular valve member is not required to transmit exhaust gases and to resist the attendant heat and corrosion associated therewith, but is on the other hand maintained at relatively lower temperatures due to the passage of scavenging and combustion air through the interior of the sleeve as will be subsequently further described.

The cylinder head 22 is provided with a shroud 56 which joins a like shroud 58 attached to the cylinder block 12. With timing gear case over 60 an enclosed chamber is formed for the retention of lubricant and exclusion of foreign material from the timing gear train.

Engaging the large end of the tapered tubular valve sleeve member 34 is a fresh air supply tube 62. This tube is mounted on the timing gear case cover 60 and carries an extension 64 telescopingly engaged with an extension 66 of the valve member 34. Seal means not shown in the form of the customary O rings are provided to permit the axial expansion or freedom for the valve member while avoiding the introduction of air into the timing gear case, and the risks of crank case explosion due to air entry.

The tubular valve sleeve member 34 and the cylinder head bore 32 in which it is mounted extend the full length of the engine block 12 to serve each of the cylinders 14 included therein with fresh air and with dense gaseous fuel. As has been described the outer surface of the valve member is tapered to match the taper of the cylinder head valve bore 32. The inner wall surface 68 of the tube is likewise tapered preferably so as to maintain a relatively uniform wall thickness throughout. The tube interior 70 receives fresh air under positive gauge pressure at its large end from the air supply blower or pump, FIGURE 5. Fresh air is forced to flow axially through the tube to be delivered to each of the cylinders in turn. The valve member has a patttern of air-ports radially through its wall, each set being angularly disposed with respect to other sets so as to introduce air into each cylinder at a predetermined piston position, or crankshaft angle.

By reference to FIGURE 1 it will be observed that ports 72, 72', 72" radially through the tubular wall will come into registration with gates 36, 36', 36" of cylinders 14 so as to admit fresh pressurized air thereto. The peripheral extent of each of the air-ports, as well as the angular location of such ports, are determined by the crank angle chosen for air admission and air cut-off events as is discussed in detail below.

Figure 7:
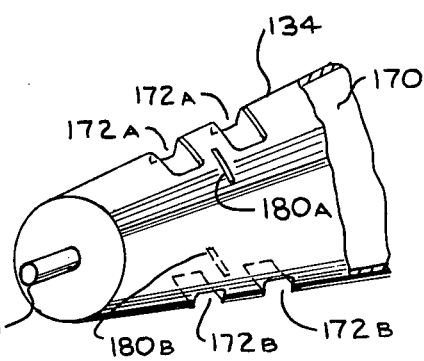
FIGURE 7 is a partial perspective view of a form of the valve member of the invention.

Also indicated in FIGURE 7, a plurality of sets of ports is represented serving the same cylinder air gates and thereby enabling the slower rotational speed and a timing ratio of one-half as has been previously discussed. The port width is determined to correspond with the axial length selected of the air gates in the cylinder head.

A feature of the invention is the placement of the tubular valve member so that its axis makes equal angles with the axis of the cylinders and so that a generatrix of the cone of the bore is parallel to the crankshaft axis which in turn permits the air admission gates to be made as long as approximately 70% of the cylinder diameter. Thus the flow capacity for entrance of air is equal to or greater than attainable with poppet type valves; combustion chamber size and shape can be selected with greater freedom. Thus even at low rotational velocities the valve action is quick and substantially no throttling of air flow occurs. Moreover, the flow of fresh air through the gates into the cylinder combustion space tends to minimize the harmful effects of the combustion temperatures to which the cylinder head is exposed.

FIGURE 2 shows a transverse elevation of engine 10, a section view taken at line II—II of FIGURE 1. Cylinder head bore 32 receives the tubular valve member 34. In the wall of valve 34, a canal 80 provides periodic communication from dense gas fuel passage 82 to nozzle 38, as dictated by the timed rotation of the valve member 34. Canal 80 is of sufficient radial depth in the valve wall to provide a transverse area approximately equal to the flow area of passage 82. It is closed to the valve interior 70. The peripheral extent of canal 80 determines the fuel admission and cut-off events, as more fully discussed in connection with FIGURE 6 hereof. Canal 80 and passage 82, serving cylinder 14, are duplicated in valve 34 at other cylinders.

Means supplying dense gas fuel is connected at flange 86, as shown and discussed hereinbelow (FIGURE 5).

Dense gaseous fuel at substantial pressure flows into cylinder 14 through nozzle 38. Pressurized fresh air simultaneously entering cylinder 14 through gates 36 (FIGURE 1) mixes turbulently and thoroughly with the gaseous fuel as piston 18 moves outwardly (from the crankshaft) compressing the now combustible charge into combustion space, pocket 30. Combustion is initiated in the conventional manner by spark plug 88.

FIGURE 3, a plan of the cylinder head pocket 30, shows the gates 36 through which air enters the cylinder 14. Gates 36, preferably are relatively long and narrow to be opened and closed rapidly. Slot length may be as much as about 70% of the cylinder diameter.

FIGURE 4, shows in section (taken along line IV—IV of FIGURE 2) an alternative form of nozzle 39 by which the entering stream of gas is deflected to intercept the combustion air delivered into cylinder 14. An insert 41 with hole 43 terminating in cross passage 45 conducts fuel gas received via canal 80 (FIGURE 2) deflecting the gas into early and thorough mixing with the combustion air.

In FIGURE 5 is shown a schematic flow diagram of fuel and air supply for the engine of the instant invention. Fresh air at elevated pressure is supplied to air supply tube 62 by a pump or blower 100. Preferably a blower of the positive displacement type is used, although certain engines can use the centrifugal type of blower. The blower may be mounted on and driven by the engine or separately as by a motor M. The air supplied may be, and for maximum effective operation over a wide load-speed range preferably is, controlled by a throttle 102 and from the throttle is delivered to the air supply 62 previously described.

The fuel supply is neither a mixture of air-and-liquid nor liquid alone but is an uncarbureted gas delivered at elevated pressure. The gas may be the commonly used liquid petroleum gas or LPG, a readily available fuel which is principally butane, propane or similar petroleum hydrocarbons. It is maintained as liquid in high pressure containers becoming a gas at moderate gauge pressures and may therefore be delivered through suitable pressure regulating means directly to valve gas passage previously described. The flow diagram of FIGURE 5 includes schematically a vapor gas generator 104 which is more fully disclosed in my application Serial 324,784, filed November 19, 1963, now abandoned, and in my co-pending application Serial No. 418,949, filed December 10, 1964. This vapor generator receives liquid fuel, supplied by a pump 106 which, by the controlled application of waste engine heat, is converted to gas at a positive gauge pressure predetermined according to the power requirements of the engine. This gas is conducted to the engine through a throttle valve 118 which may be manually, remotely, or automatically controlled. The fuel gas throttle 118 and the air throttle 102 are interconnected by a mechanical linkage 120 by which means the fuel-air ratio can be selected and controlled throughout the range of fuel flow.

Figure 6:
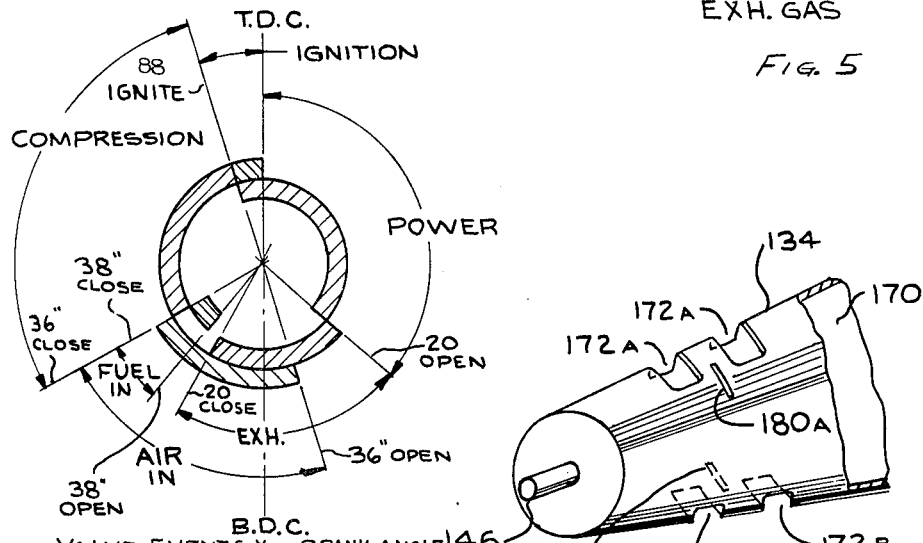
FIGURE 6 is a valve event diagram applicable to the engine of the instant invention.

FIGURE 6 is a valve event diagram which shows schematically a typical series of valving events as occur in one cylinder and in one revolution of the crankshaft. It will be understood that this may represent one revolution, one-half revolution, or other fraction of revolutions of the valve sleeve member. Since the appropriate positioning of the events in terms of crank rotation will be dependent upon the type of fuel chosen and the service for which the engine is intended, which choices are well known and understood to those skilled in the art, it is considered to be positively misleading to specify exact crank angles for the various events. The numerical values shown, therefore, are general indications and do not necessarily represent a single preferable combination. For convenience in description the sequence of events will begin at the bottom dead-center BDC which is the position shown of piston in cylinder 14″ of FIGURE 1. In this position the exhaust passages 20 are fully uncovered by the piston 18″, cylinder air gates 36″ and air ports 72″ of the valve sleeve member 34 are in register for the passage of scavenging air therethrough. Fresh air from blower supply line enters and flows axially within the tubular valve member 34 and blows radially outward through the air port 72″ into the top of the cylinder 14″ thereby forcing the spent gases and products of combustion outwardly through the exhaust ports 20 into the previously mentioned exhaust collector pipes (not shown). Moving outward or upwardly, the piston 18″ covers the exhaust openings 20; fresh air continues to enter; at about this crank angle the gaseous fuel canal 80 in the outer surface of the tubular sleeve valve member 34 opens communication for fuel from the gas passage 82 into the gas nozzle 38″ and airless dense gaseous fuel is introduced into the top of the combustion chamber to intermix with the entering air. The piston continues to rise in the cylinder, reducing the volume and thereby increasing the pressure. As this pressure increase approaches the pressure of the air being supplied, the valve member 34, rotating, closes the air gate 36″. The gaseous fuel, being supplied at relatively higher pressure, is closed at the same or later crank-angle as is indicated by the diagram. The combustion chamber is now closed, the piston continues to rise further compressing the charge to the desired ignition point.

At a predetermined crank-angle the charge is ignited, by a spark from a spark plug; burning is initiated. As is usual the spark is applied some degrees ahead of the top dead-center point TDC both to gain burning time so as to complete the combustion of fuel, and also to counteract partially or entirely the momentum of the piston and connecting rod at the end of the stroke. The combustion process then continues through the charge from the ignition point to its completion and from the TDC point the products of combustion continue to expand, the piston moving inwardly or downwardly to the point at which the exhaust pasages 20 are again opened. At this point a cylinder pressure drops off rapidly and valve sleeve member 34 continuing to rotate opens the air gates 36″ to admit fresh air for the scavenging or purging operation.

Preferably, the exhaust passages are opened at the smallest time or crank-angle, ahead of BDC which will permit the cylinder pressure to drop to the level of the air supply system pressure. (This higher air supply pressure enables shorter exhaust time.) In the engine modification shown the scavenging air enters the cylinder in very turbulent flow having a relatively flat velocity profile and tends therefore to push the spent gas downward to the exhaust passage with relatively little intermixing so that the scavenging is unusually thorough.

By so reducing the exhaust period and intake peirod, the engine described is enabled to utilize nearly all of the inward stroke to deliver power to the crankshaft, thus more nearly approaching the theoretical 2:1 advantage over the 4-cycle engine.

By providing to the cylinders of this engine both fresh air and gaseous fuel at positive gauge pressure the volumetric efficiency can be very considerably increased relative to the comparable aspiration engine.

In FIGURE 7 there is shown an alternative form of the rotatable tubular valve member (34 of FIGURE 1). The perspective view shows a portion only of valve member 134, such as to correspond with portions of valve member 34 associated with cylinder 14, gates 36, nozzle 38 in FIGURE 1.

Air ports 172a and 172b, with canals 180a and 180b comprise two sets, a and b, of air and fuel valve means. Rotation of valve member 134 moves set a through a cycle, or sequence of valve events such as has been described (FIGURE 6); continuing rotation then moves set b through a like cycle. It can of course be demonstrated that three or more sets of air and fuel means can in like manner be equally spaced peripherally in the tubular valve member 134.

Valve member 134 has an identical plurality of sets associated with each cylinder, displaced angularly to suit the firing order of the engine.

The engine timing drive relating the rotation of valve member 134 to reciprocal movement of associated piston will cause (exactly) one-half revolution for each firing stroke of piston 18. With three sets of ports in such valve member, the valve member must rotate one third revolution for each firing stroke. By obvious logic, the engine timing drive ratio: (revolutions of valve member)÷(firing strokes of one piston) must equal $1/N$, where N represents the number of sets of air ports 172, and of canals 180, disposed peripherally around the valve member for each cylinder.

Among the advantages of this feature is the use of lower surface speed or of lower rotational speed for the valve member. Moreover, its diameter may be larger, stronger, stiffer, to resist higher cylinder combustion pressures.

The invention further provides a method of operating, of fueling an internal combustion engine, preferably of the two-stroke cycle type. Fuel and air are mixed to combustible proportion only within the engine, taking advantage of the fact that gases intermix, diffuse into one another many times more rapidly than do liquids, however finely dispersed. Fresh air under considerable pressure flows into the engine—purging burned gases—cooling the combustion chamber. Dense gas fuel is introduced, preferably at pressure slightly higher than the air.

Air admission to the engine cylinder, interrupted during the compression-combustion part of the cycle, requires a minimum part of the cycle, 90° of crank rotation or less.

In the two-cycle modification preferred, the engine has no intake suction stroke, combustion air being supplied under positive gauge pressure at the beginning of the compression stroke. In certain engines a suction breaker valve may be provided to facilitate starting.

From the foregoing description it will be apparent that I have provided an internal combustion engine having a rotatable tubular sleeve valve and cylinder head arrangement adapted to the separate admission of fresh air and gaseous fuel and a method of operating a reciprocal internal engine which meets the objects declared and provides the features and advantages disclosed herein. I have set forth in the foregoing description the best mode presently known to me of putting my invention into practice. I have indicated certain equivalent constructions and others will be apparent to those skilled in the art as being suitable in the practice of my invention. I do not desire to be limited to the exact details of construction shown and described but only as particularly pointed out and distinctly claimed below.

I claim:

1. An internal combustion engine having one or more cylinders and pistons reciprocable along axes of said cylinders comprising
   a cylinder head
   an interior wall defining a bore
   gate means in said head opening into each cylinder from said bore
   nozzle means separate and apart in the head from said gate means
   gas passage means opening into said bore from an exterior surface of said cylinder head
   a rotatable tubular valve member fitted into said bore open at one end to admit fresh air axially thereinto
   timing means driving said valve member in timed relation with said pistons
   port means of predetermined partial peripheral extent open radially through the wall of said valve member
   means defining canal closed to communication with the interior of said valve member
   periodic opening of flow communication from said gas passage to said nozzle means.

2. An internal combustion engine of the two-stroke-cycle class having one or more cylinders and pistons reciprocable along axes of said cylinders
   a cylinder head having an interior wall defining a bore
   gate means in head opening into each cylinder from said bore
   nozzle means separate and apart in the head from said gate means
   gas passage means opening into said bore from an exterior surface of said cylinder head
   a rotatable tubular valve member open at one end to admit fresh air axially thereinto
   timing means driving said valve member in timed relation with said pistons
   port means of predetermined partial peripheral extent open radially through the wall of said valve member for peroidic registration with said gate means
   means defining canal closed to communication with the interior of said valve member
   periodic opening of flow communication from said gas passage to said nozzle means
   blower supplying fresh air at positive gauge pressure into the interior of said valve member
   means supplying airless dense gas fuel separate and apart from said blower to said gas passage means.

3. In an internal combustion engine of the two-stroke-cycle class having one or more cylinders and pistons reciprocable along axes of said cylinders the combinations comprising
   a cylinder head
   an interior wall defining a tapered bore
   gate means in said head opening into each cylinder from said bore
   nozzle means separate and apart in the head from said gate means
   gas passage means opening into said bore from an exterior surface of said cylinder head
   a tapered rotatable tubular valve member fitted into said bore open at one end to admit fresh air axially thereinto
   timing means driving said valve member in timed relation with said pistons
   port means of predetermined partial peripheral extent open radially through the wall of said valve member for periodic registration with said gate means
   means defining canal closed to communication with the interior of said valve member
   periodic opening of flow communication from said gas passage to said nozzle means
   blower supplying fresh air at positive gauge pressure into the interior of said valve member
   means supplying airless dense gas fuel separate and apart from said blower to said gas passage means.

4. An internal combustion engine of the two-strokecycle class having one or more cylinders and pistons reciprocable along axes of said cylinders
  a cylinder head having an interior wall defining a bore
  gate means in said head opening into each cylinder from said bore
  nozzle means separate and apart in the head from said gate means
  gas passage means opening into said bore from an exterior surface of said cylinder head
  a rotatable tubular valve member open at one end to admit fresh air axially thereinto
  timing means driving said valve member in timed relation with said pistons
  port means of predetermined partial peripheral extent open radially through the wall of said valve member for periodic registration with said gate means
  means defining canal closed to communication with the interior of said valve member
  periodic opening of flow communication from said gas passage to said nozzle means
  blower supplying fresh air at positive gauge pressure into the interior of said valve member
  means supplying airless dense gas fuel separate and apart from said blower to said gas passage means
  spring means urging said valve member toward the smaller end of said bore.

5. An internal combustion engine of the two-stroke-cycle class having one or more cylinders and pistons reciprocable along axes of said cylinders comprising
  a cylinder head
  an interior wall defining a tapered bore
  gate means in said head opening into each cylinder from said bore
  nozzle means separate and apart in the head from said gate means having means deflecting gas flow therefrom to intercept air flow from said gate means
  gas passage means opening into said bore from an exterior surface of said cylinder head
  a tapered rotatable tubular valve member fitted into said bore open at one end to admit fresh air axially thereinto
  timing means driving said valve member in timed relation with said pistons
  port means of predetermined partial peripheral extent open radially through the wall of said valve member for periodic registration with said gate means
  means defining canal closed to communication with the interior of said valve member
  periodic opening of flow communication blower supplying fresh air at positive gauge pressure into the interior of said valve member
  means supplying airless dense gas fuel separate and apart from said blower to said gas passage means.

6. An internal combustion engine of the two-stroke-cycle class having one or more cylinders and pistons reciprocable along axes of said cylinder
  a cylinder head having an interior wall defining a bore
  gate means in said head opening into each cylinder from said bore
  nozzle means separate and apart in the head from said gate means
  gas passage means opening into said bore from an exterior surface of said cylinder head
  a rotatable tubular valve member open at one end to admit fresh air axially thereinto
  timing means driving said valve member in timed relation with said pistons
  port means of predetermined partial peripheral extent open radially through the wall of said valve member for periodic registration with said gate means
  means defining canal closed to communication with the interior of said valve member
  periodic opening of flow communication from said gas passage to said nozzle means
  blower supplying fresh air at positive gauge pressure into the interior of said valve member
  means supplying airless dense gas fuel separate and apart from said blower to said gas passage means
  throttling means regulating said fresh air supply.

7. An internal combustion engine of the two-stroke-cycle class having one or more cylinders and pistons reciprocable along axes of said cylinders
  a cylinder head having an interior wall defining a bore
  gate means in said head opening into each cylinder from said bore
  nozzle means separate and apart in the head from said gate means
  gas passage means opening into said bore from an exterior surface of said cylinder head
  a rotatable tubular valve member open at one end to admit fresh air axially thereinto
  timing means driving said valve member in timed relation with said pistons
  port means of predetermined partial peripheral extent open radially through the wall of said valve member for periodic registration with said gate means
  means defining canal closed to communication with the interior of said valve member
  periodic opening of flow communication from said gas passage to said nozzle means
  blower supplying fresh air at positive gauge pressure into the interior of said valve member
  means supplying airless dense gas fuel separate and apart from said blower to said gas passage means
  throttling means regulating said airless dense gas fuel.

8. An internal combustion engine of the two-stroke-cycle class having one or more cylinders and pistons reciprocable along axes of said cylinders
  a cylinder head having an interior wall defining a bore
  gate means in said head opening into each cylinder from said bore
  nozzle means separate and apart in the head from said gate means
  gas passage means opening into said bore from an exterior surface of said cylinder head
  a rotatable tubular valve member open at one end to admit fresh air axially thereinto
  timing means driving said valve member in timed relation with said pistons
  port means of predetermined partial peripheral extent open radially through the wall of said valve member for periodic registration with said gate means
  means defining canal closed to communication with the interior of said valve member
  periodic opening of flow communication from said gas passage to said nozzle means
  blower supplying fresh air at positive gauge pressure into the interior of said valve member
  means supplying airless dense gas fuel separate and apart from said blower to said gas passage means
  throttling means regulating said fresh air supply
  throttling means regulating said airless dense gas fuel
  linkage means interconnecting said first throttling means and second throttling means.

9. An internal combustion engine having one or more cylinders and pistons reciprocable along axes of said cylinders comprising
  a cylinder head
  an interior wall defining a bore
  gate means in said head opening into each cylinder from said bore
  nozzle means separate and apart in the head from said gate means
  gas passage means opening into said bore from an exterior surface of said cylinder head
  a rotatable tubular valve member fitted into said bore open at one end to admit fresh air axially thereinto
  timing means driving said valve member in timed relation with said pistons a plurality of port means of predetermined partial peripheral extent open radially through the wall of said valve member a plurality of means defining canals closed to communication with the interior of said valve member successive periodic registration with said gate means and periodic opening of flow communication from said gas passage to said nozzle means respectively, said timing means driving said valve member at $1/N$ times firing strokes of piston, N being equal to the number of port means means defining canals per cylinder in said rotatable tubular valve member.

10. An internal combustion engine of the two-stroke-cycle class having one or more cylinders and pistons reciprocable along axes of said cylinders a cylinder head having an interior wall defining a bore having a small diameter end and a large diameter end gate means in said head opening into each cylinder from said bore nozzle means separate and apart in the head from said gate means gas passage means opening into said bore from an exterior surface of said cylinder head a rotatable tubular valve member open at one end to admit fresh air axially thereinto timing means driving said valve member in timed relation with said pistons port means of predetermined partial peripheral extent open radially through the wall of said valve member for periodic registration with said gate means means defining canal closed to communication with the interior of said valve member periodic opening of flow communication from said gas passage to said nozzle means blower supplying fresh air at positive gauge pressure into the interior of said valve member means supplying airless dense gas fuel separate and apart from said blower to said gas passage means spring means urging said valve member toward the smaller end of said bore said timing means including a pair of helical gears producing axial thrust urging said valve member toward the larger end of said bore.

References Cited by the Examiner
UNITED STATES PATENTS

| | | | |
|---|---|---|---|
| 2,587,842 | 3/52 | Hall | 123—80 |
| 2,763,248 | 9/56 | Green et al. | 123—65 |
| 2,895,459 | 7/59 | Sbaiz | 123—32 X |

FRED E. ENGELTHALER, *Primary Examiner.*